Oct. 31, 1967  E. B. WAGNER  3,349,864
TRANSMISSION MOUNTING IN AN ARTICULATED VEHICLE
Filed May 20, 1966

INVENTOR.
EDDIE B. WAGNER
BY
*[signature]*
Attorney

United States Patent Office 3,349,864
Patented Oct. 31, 1967

3,349,864
TRANSMISSION MOUNTING IN AN
ARTICULATED VEHICLE
Eddie B. Wagner, Portland, Oreg., assignor to Wagner Mining Scoop, Inc., Portland, Oreg., a corporation of Oregon
Filed May 20, 1966, Ser. No. 551,643
7 Claims. (Cl. 180—51)

ABSTRACT OF THE DISCLOSURE

An articulated vehicle such as a shovel loader having its transmission pivotally mounted in otherwise unused space between the front and rear body sections to shorten the vehicle and reduce its minimum turning radius for greater maneuverability.

---

Figure 1:
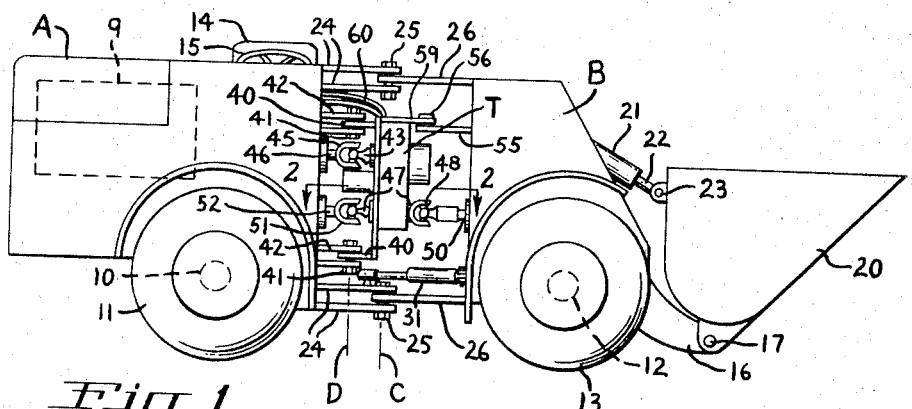

This invention relates to an improved transmission mounting for a vehicle of the type having two body sections which are connected together for relative pivotal movement about a vertical axis between the two sections for steering.

In vehicles of this type each body section is supported on a single axle and steering is accomplished by turning the two body sections out of longitudinal alignment with each other by means of hydraulic cylinder and piston units connected between the two sections. A primary advantage of this type of construction is maneuverability or, more specifically, a short turning radius. Because of this advantage, such vehicles are extensively used for various types of work where maneuverability is an essential requirement. A loader vehicle is illustrated by way of example but the invention is not limited to loaders.

In this type of vehicle, as heretofore constructed, one body section contains the engine and transmission and the other body section contains the components for doing the work the vehicle is designed to do. Considerable open space is necessary between the two body sections in order to allow the necessary angularity between the two sections for sharp turns. The length of the body section containing the engine and transmission has heretofore been dictated by the combined length of an engine and transmission having the requisite capacity to do the intended work. It would be desirable to shorten this body section and utilize the open space between the two body sections in order to shorten the wheel base and overall length and achieve an even shorter turning radius.

The general object of the invention is, therefore, to provide improvements in a vehicle of the type described in order to improve its maneuverability and, more specifically, to shorten the vehicle and reduce its minimum turning radius. Other objects are to remove the transmission from the body section containing the engine so that body section may be shortened, to re-locate the transmission in unused space between the two body sections and to provide a novel and improved transmission mounting for the purpose described.

In the present vehicle, the transmission is pivotally mounted to swing between the two body sections when the vehicle turns. The body section containing the engine is reduced in length by an amount equal to the length of the transmission whereby the overall length of the vehicle is reduced by a like amount and the axles are placed closer together. This produces a two-fold improvement in maneuverability. The closer spacing of the axles shortens the turning radius and the reduction in overall length of the vehicle in itself reduces the wall-to-wall space required for turning. This is of great importance in vehicles working in mines or tunnels or any other place where there is limited turning space.

The invention will be better understood and the foregoing and additional objects and advantages will become apparent from the following detailed description of the preferred embodiment illustrated on the accompanying drawing. Various changes may be made, however, in the details of construction and arrangement of parts and certain features may be used without others. All such modifications within the scope of the appended claims are included in the invention.

Figure 2:
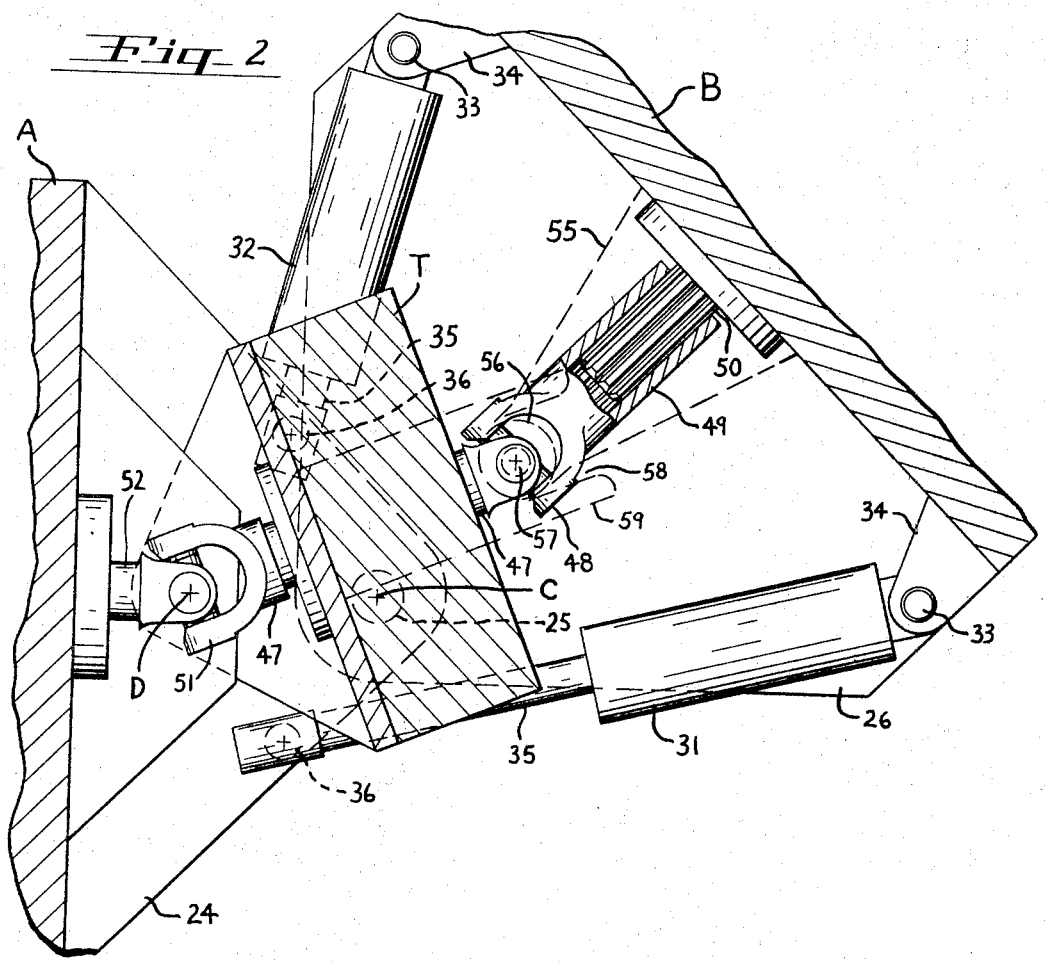

In the drawing:
FIGURE 1 is a side elevation view of a vehicle embodying the invention; and
FIGURE 2 is an enlarged fragmentary view on the line 2—2 in FIGURE 1.

By way of example, the invention is embodied in a loader vehicle as illustrated in FIGURE 1. The vehicle comprises a pair of body sections A and B. Body section A contains an internal combustion engine 9 and is supported on a single transverse axle 10 having a pair of driving wheels 11 on opposite sides of the vehicle. Body section B is supported on a single transverse axle 12 having a pair of driving wheels 13 on opposite sides of the vehicle. The driver sits sideways in a driver's seat 14 in body section A and steers the vehicle by means of a conventional steering wheel 15.

For use as a loader vehicle, the body section B is equipped with a vertically movable boom 16 on the forward end of which is pivotally mounted at 17 the loader bucket 20. The bucket may be tilted and erected by a hydraulic cylinder, or cylinders 21, pivotally connected to the boom 16 and containing a piston rod 22. Piston rod 22 is pivotally connected at 23 to the bucket 20. Thus, the bucket may be tilted forward for scooping and dumping and may be erected to the position shown for carrying its load. Body section B also contains an additional cylinder or cylinders, not shown, for raising and lowering the boom in conventional manner. A high degree of maneuverability is necessary to place the vehicle quickly and conveniently in different positions for scooping and dumping.

The right end of the vehicle will be referred to as the front end and the left end as the rear end. Extending forward from the front end of body section A are upper and lower pairs of ears 24 which carry upper and lower vertical kingpin bolts 25 disposed on the vertical steering axis C. Extending rearwardly from the rear end of the body section B are upper and lower apertured ears 26 pivotally connected with the kingpin bolts 25. This kingpin connection permits the body sections A and B to be pivoted out of longitudinal alignment with each other for turning a corner.

Turning is accomplished by a pair of double acting hydraulic steering cylinders 31 and 32 as shown in FIGURE 2. The forward ends of the cylinders are pivotally connected at 33 to a pair of ears 34 on opposite sides of body section B. Extending from the rear ends of the cylinders are piston rods 35 which are pivotally connected at 36 to one of the ears 24 on body section A. Steering wheel 15 operates a conventional steering valve to control the admission of hydraulic pressure from an engine-driven pump to opposite ends of the cylinders 31 and 32 for turning the body sections A and B relative to each other about the kingpin axis C.

For example, in executing a left turn as shown in FIGURE 2, pressure has been admitted to the rear or rod end of cylinder 32 and relieved from the forward end of the cylinder while at the same time pressure has been admitted to the forward end of cylinder 31 and relieved from its rear end. This is a conventional steering apparatus well understood by persons skilled in the art and the steering valve and hydraulic connections to the opposite ends of the cylinders are not shown.

The structure thus far described is conventional except that in a conventional vehicle of this type the body section A is longer in order to accommodate the length of the transmission at the front end of the engine. In the present vehicle, body section A has been shortened by removing the transmission and mounting it between the two body sections as indicated at T. The transmission is supported by a pair of upper and lower apertured ears 40 which are pivotally mounted on vertical bolts 41 carried by upper and lower pairs of ears 42 on body section A. The bolts 41 are located on the vertical axis D at a distance behind the kingpin axis C.

The transmission has an input shaft 43 connected through a universal joint 45 with the engine output shaft 46. The center of universal joint 45 is located on vertical axis D. The transmission has an output shaft 47. The front end of output shaft 47 is connected through a universal joint 48 with a forward drive shaft 50 which drives the front wheels 13. Universal joint 48 includes an internally splined sleeve 49 which receives the externally splined end of shaft 50 whereby the shaft may slide longitudinally of the sleeve. The rear end of output shaft 47 is connected through a universal joint 51 with a rear longitudinal drive shaft 52 which drives the rear wheels 11. The center of universal joint 51 is also located on vertical axis D and the center of universal joint 48 is located forward from kingpin axis C a distance equal to the distance between axes C and D.

This arrangement provides a four wheel drive. When a two wheel drive is desired, the output shaft 47 is not a single continuous shaft and the transmission is equipped with disconnects to disconnect the transmission from front drive shaft 50 or rear drive shaft 52.

When the body sections A and B are aligned with each other for straight forward travel, kingpin axis C intersects the axis of transmission output shaft 47. Preferably, this point of intersection is approximately midway between the centers of universal joints 48 and 51 but this relationship is not critical. In making a turn as illustrated in FIGURE 2, the transmission rotates about axis D relative to body section A while body section B rotates about kingpin axis C and the angle between A and T is approximately half the angle between A and B. In other words, the direction of shaft 47 bisects the angle between shafts 50 and 52. The universal joints 48 and 51 thereby operate more efficiently and with less wear since the angularity in the universal joints is only half the angularity which occurs in the drive shaft when the transmission is conveniently fixedly mounted in body section A. Universal joint 45 assumes the same angularity as universal joint 51.

Splined sleeve 49 allows for variation in the distance between shaft 50 and the transmission when the vehicle turns. Shaft 50 has simple arcuate movement about kingpin axis C relative to shaft 52. Sleeve 49, on the other hand, swings about axis D and also about the center of universal joint 48 since it maintains its alignment with shaft 50. This compound movement shortens the distance between the end of shaft 50 and the transmission, causing the end shaft 50 to slide farther into sleeve 49 when the vehicle turns. The distance between the end of shaft 50 and the transmision is at a maximum when body sections A and B are aligned for straight forward travel.

The transmission is rotated by a rearwardly extending arm 55 on front body section B. The rear end of arm 55 carries a roller 56 on a vertical pin 57 which is approximately on the vertical axis of universal joint 48. Roller 56 is disposed in a longitudinal slot 58 in a forwardly extending arm 59 on the transmission. When the vehicle turns sharply, roller 56 moves toward the rear end of slot 58 as seen in broken lines in FIGURE 2 and when the vehicle straightens out the roller moves forward in the slot the same as shaft 50 moves forward in sleeve 49.

The driving ratio of the transmission is shifted to its various forward and reverse speeds by conventional flexible control conduits or cables 60 or other suitable means. The previously mentioned disconnects, when provided, are operated in the same way.

Thus, it will be apparent that body section A has been shortened by an amount equal to the length of transmission T thereby shortening the wheel base of the vehicle and also reducing its overall length. It will also be apparent that the transmission is located in what has heretofore been waste space in this type of vehicle. In order to make a sharp turn as shown in FIGURE 2, the ears 24 and 26 on the two body sections must be of sufficient length to permit the necessary angular relationship of the two body sections. This clearance space between the rear of body section B and the front of body section A has heretofore not been utilized for any useful purpose and has been accepted as unavoidable waste space. The transmission T being relatively narrow is accommodated nicely in this space and does not interfere in any way with the articulating movements of the body section. With the transmission mounted in this manner, the vehicle may turn on a shorter radius and may turn around without backing in a narrower space between tunnel walls or embankments.

Having now described my invention and in what manner the same may be used, what I claim as new and desire to protect by Letters Patent is:

1. In a vehicle having a pair of body sections connected together for relative pivotal movement about a vertical axis between the two sections for steering, and an engine in one of said sections for driving the vehicle; the improvement comprising a transmission pivotally mounted between said two sections, and universal joints connecting said transmission with said engine and with a drive shaft for the vehicle, said pivotal mounting for said transmission being on one of said body sections in spaced relation to said steering axis, there being a drive shaft in each of said sections connected with said transmission by a universal joint, the universal joints connecting the transmission with said engine and with said drive shaft in said one section, and the pivotal mounting for the transmission, all being located on a common vertical axis.

2. A vehicle as defined in claim 1, said transmission having a power output shaft connected at its opposite ends with several universal joints for said two drive shafts.

3. A vehicle as defined in claim 2, said pivotal steering axis bisecting the length of said output shaft when said shaft is in poistion to intersect said axis.

4. A vehicle having two body sections connected together for relative pivotal movement about a vertical axis between the sections for steering, an engine in one of said sections having an engine shaft, drive shafts in both of said sections, a transmission disposed between said sections and pivotally mounted on said one section on a vertical axis located between said one section and said steering axis, input and output shafts in said transmission, a universal joint located on said transmission mounting axis connecting said engine shaft and said transmission input shaft, a universal joint located on said transmission mounting axis connecting one end of said transmission output shaft and said drive shaft in said one section, and a universal joint connecting the opposite end of said transmission output shaft with said drive shaft in said other section.

5. In a vehicle having a pair of body sections connected together for relative pivotal movement about a vertical axis between the two sections for steering, and an engine in one of said sections for driving the vehicle; the improvement comprising a transmission pivotally mounted between asid two sections, universal joints connecting said transmission with said engine and with a drive shaft for the vehicle, longitudinal arms on said transmission and one of said body sections, a vertical roller on one of said arms, and a longitudinal slot receiving said roller in the other arm arranged to swing said transmission on its pivotal mounting when the vehicle turns.

6. A vehicle as defined in claim 5, said drive shaft universal joint being approximately on the vertical axis of said roller.

7. A vehicle as defined in claim 6, said transmission being pivotally mounted on the body section containing said engine, said engine universal joint and the pivotal mounting for said transmission being on a common vertical axis, and said longitudinal arm which is on one of said body sections and said drive shaft being in the other body section.

References Cited

UNITED STATES PATENTS 3,270,829  9/1966  Steiger et al. _____ 180—51

A. HARRY LEVY, *Primary Examiner.*